United States Patent [19]

Boden

[11] Patent Number: 5,440,788

[45] Date of Patent: Aug. 15, 1995

[54] CORD LOCK OF ELASTOMERIC MATERIAL

[76] Inventor: Robert O. Boden, 1580 Gaywood Dr., Altadena, Calif. 91001

[21] Appl. No.: 222,387

[22] Filed: Apr. 4, 1994

[51] Int. Cl.$^6$ .............................................. A44B 21/00
[52] U.S. Cl. ................................. 24/115 H; 24/129 D; 24/129 W
[58] Field of Search ............. 24/115 H, 115 G, 129 D, 24/129 W, 115 A, 131 C, 543, 545, 17 B, 300, 30.5 S, 49 S

[56] References Cited

U.S. PATENT DOCUMENTS

| | | | |
|---|---|---|---|
| 1,907,629 | 5/1933 | Walty | 24/712.2 |
| 2,581,366 | 1/1952 | De Grazia | 24/115 H |
| 2,783,515 | 3/1957 | Tobias | 24/545 |
| 3,043,902 | 7/1962 | Klein | 24/129 D |
| 3,080,867 | 3/1963 | Eichinger | 24/115 G |
| 3,132,390 | 5/1964 | Boden . | |
| 3,170,213 | 2/1965 | Thomas, Jr. | 24/30.5 S |
| 3,827,790 | 8/1974 | Wenzel | 24/129 W |
| 3,845,575 | 11/1974 | Boden . | |
| 3,861,003 | 1/1975 | Boden . | |
| 3,953,144 | 4/1976 | Boden . | |
| 3,965,544 | 6/1976 | Boden . | |
| 4,102,019 | 7/1978 | Boden . | |
| 4,156,574 | 5/1979 | Boden . | |
| 4,288,891 | 9/1981 | Boden . | |
| 4,300,269 | 11/1981 | Boden . | |
| 4,373,234 | 2/1983 | Boden . | |
| 4,424,609 | 1/1984 | Boden . | |
| 4,477,947 | 10/1984 | Lyons | 24/115 G |
| 4,639,978 | 2/1987 | Boden . | |
| 4,807,333 | 2/1989 | Boden . | |
| 4,901,402 | 2/1990 | Begemann | 24/129 D |

FOREIGN PATENT DOCUMENTS 0417157  9/1934  United Kingdom ............. 24/115 H

Primary Examiner—Victor N. Sakran
Attorney, Agent, or Firm—William P. Green

[57] ABSTRACT

A cord lock including a body of resiliently deformable elastomeric material containing a passage through which one or more cords extend, with the passage having walls urged by the resilience of the elastomeric material against opposite sides of a cord or cords in the passage to resist movement of the cord or cords longitudinally relative to the body, and with the body being manually compressible by a user in a manner spreading the walls of the passage apart against the resilience of the elastomeric material and thereby releasing the cord or cords for movement longitudinally relative to the body. The cords may be of a type having outer essentially smooth and essentially continuous preferably cylindrical surfaces for frictionally contacting the walls of the passage. Flexible resinous plastic tubing is the preferred material for the cords. The elastomeric body of the lock device has projections at its opposite sides to be engaged by the thumb and forefinger of a user's hand in squeezing the body of the device. The elastomeric body-may have an outer spherical surface, with the projections extending in opposite directions beyond that surface. The passage in the body through which the cords extend, as viewed in transverse section, may have a relatively narrow width dimension between the two walls which grip and hold the cord or cords, and have a greater dimension generally perpendicular to that width dimension, with the body being squeezed in the direction of that second dimension in releasing the locking action.

13 Claims, 1 Drawing Sheet

CORD LOCK OF ELASTOMERIC MATERIAL

This invention relates to improved cord lock devices, adapted to engage a cord or cords and releasably retain the cords against longitudinal movement relative to the device.

BACKGROUND OF THE INVENTION

Various types of cord locks have been devised in the past for holding a cord in a tightened or other desired condition in clothing, bags, shoes, and other items. These prior cord locks have been formed of two or more parts, adapted to grip and release a cord by relative movement between the parts. The expense involved in forming such parts and then assembling them has limited use of the locks, and prevented their use in many instances in which it might otherwise be desirable to utilize a lock in lieu of hand tying of a cord.

SUMMARY OF THE INVENTION

A purpose of the present invention is to provide an improved cord lock which can be manufactured and sold less expensively than prior locks. A lock embodying the invention may be formed of a single body of resiliently deformable elastomeric material containing a passage through which a cord or cords may extend, with the body normally gripping the cords to restrain their relative longitudinal movement but being manually actuable to a condition in which the cord or cords may move longitudinally relative to the cord lock device. The passage has walls which are normally urged by the resilience of the elastomeric material against opposite sides of a cord or cords received in the passage to frictionally grip the cord or cords and restrain longitudinal movement thereof. The body is manually compressible between the thumb and forefinger of a user in a manner spreading apart the walls which engage the cord or cords, and thus opening the passage to a condition releasing the cord or cords for longitudinal movement.

The cords are preferably of a type having an outer smooth and continuous, desirably cylindrical, surface which is engageable by the side walls of the passage in the elastomeric body in a manner developing sufficient friction to attain the cord locking action. The cords may be formed of a resiliently deformable flexible elastomeric material, such as a flexible resinous plastic substance, and for best results take the form of small diameter flexible tubing.

The passage in the cord lock body through which the cord or cords extend may have a relatively small width dimension, as viewed in transverse cross-section, with that width dimension being defined by the previously mentioned two opposite side walls of the passage which grip the cord or cords in the locking condition of the device. A second transverse dimension of the passage generally perpendicular to the width dimension may be substantially greater than the width dimension to enhance the opening and closing action of the device. In releasing the locking action, a user may squeeze the elastomeric body of the cord lock in the direction of the mentioned second dimension, to thereby spread the cord gripping walls relatively apart, increasing the width dimension, and relieving, the holding force applied by the walls on the cord or cords. The elastomeric body preferably has projections at its opposite sides indicating the locations at which the body should be engaged and squeezed, and also maximizing the extent to which the passage is opened by the squeezing action. Desirably, the external surface of the elastomeric body is essentially spherical, with the projections extending outwardly in opposite directions beyond this spherical surface and preferably being elongated parallel to one another and longitudinally of the passage.

BRIEF DESCRIPTION OF THE DRAWING

The above and other features and objects of the invention will be better understood from the following detailed description of the typical embodiment illustrated in the accompanying drawing in which.

DESCRIPTION OF THE PREFERRED EMBODIMENT

Figure 1:
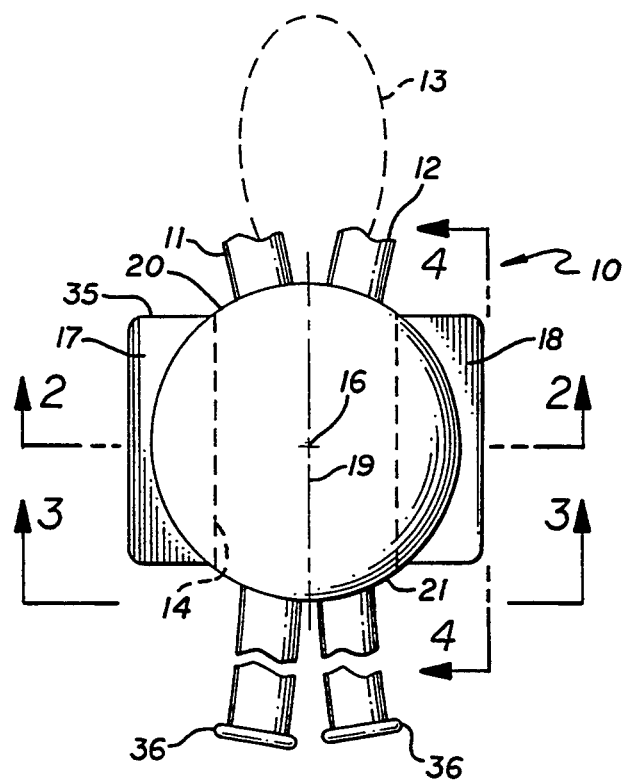
FIG. 1 is a front elevational view of a cord and cord lock assembly embodying the invention.

FIG. 1 illustrates at 10 a cord lock embodying the invention through which one or more cords may extend, to lock the cord or cords against longitudinal movement relative to device 10. The cord lock is typically illustrated in FIG. 1 with two cords 11 and 12 extending through it in parallel relation. These may be two separate cords, or be opposite ends of a single cord, as represented diagrammatically at 13, with that single cord typically functioning as the drawstring of a garment, bag or the like. The cord or cords 11 and 12 are preferably formed of flexible resiliently deformable resinous plastic tubing.

Figure 3:
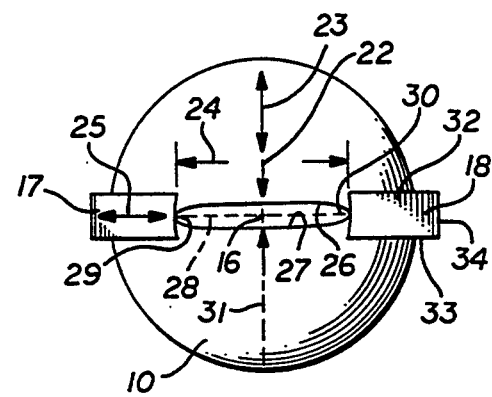
FIG. 3 is an end view of the cord lock device taken on line 3—3 of FIG. 1, with the elastomeric body of the cord lock shown in the position to which it tends to return when no cords are present in the device.
Figure 4:
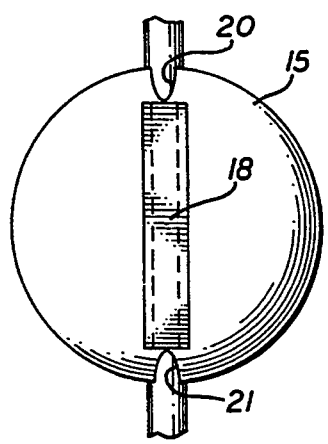
FIG. 4 is a side view taken on line 4—4 of FIG. 1.
Figure 2:
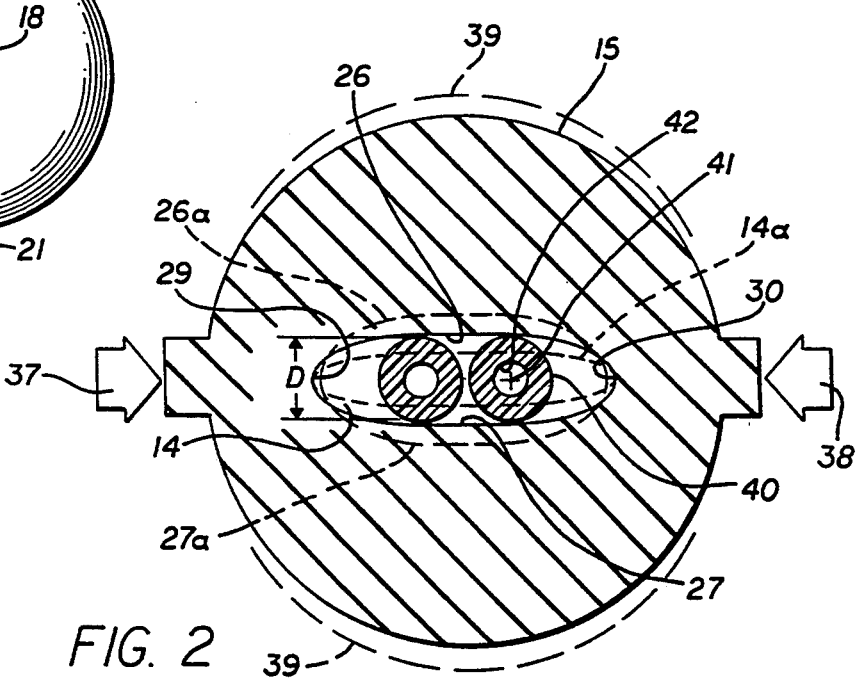
FIG. 2 is an enlarged transverse section taken on line 2—2 of FIG. 1.

The locking device 10 is formed as a single body of resiliently deformable elastomeric material molded to the shape illustrated in the drawings and having a passage 14 through which the cords 11 and 12 extend. Externally, the elastomeric body 10 has an outer spherical surface 15 which has its center at 16 in the figures, and which extends continuously about the outside of body 10 except as surface 15 is interrupted by passage 14 and by two projections 17 and 18 at opposite sides of the body. Passage 14 is centered about an axis 19 which extends through the center 16 of the outer spherical surface 15. FIG. 3 illustrates the condition to which the elastomeric material of body 10 tends to return by its own resilience when no cords are present in passage 14. In that condition, the cross-section of passage 14 transversely of axis 19 is as illustrated in FIG. 3, and that cross-section is uniform along the entire length of the passage between its opposite ends 20 and 21 (see FIGS. 1 and 4). The normal FIG. 3 transverse sectional configuration of passage 14, to which the passage returns when no cords are present in the device, is illustrated in FIG. 2 by broken lines 14a.

To describe the shape of passage 14 as it appears in FIG. 3 more specifically, the passage has a relatively narrow width dimension 22 in a first direction 23 perpendicular to axis 19, and has a greater dimension 24 in a second direction 25 perpendicular to the axis and to direction 23. The width 22 is defined by two generally parallel opposite side walls 26 and 27 of the passage spaced equidistantly at opposite sides of a plane 28 containing axis 19. At their right and left edges as viewed in FIG. 3, the walls 26 and 27 may be joined by curved surfaces 29 and 30 defining the major dimension 24 of the transverse sectional configuration of the passage. As seen in FIG. 3, walls 26 and 27 are preferably not directly planar, but rather bow slightly away from one another so that the width dimension between walls 26 and 27 gradually increases toward the location of a central plane 31 perpendicular to plane 28 and extending through axis 19. The dimension 24 of passage 14 is preferably at least about 3 times, and for best results between about 3 and 8 times, the narrower width dimension 22 of the passage.

Projections 17 and 18 are formed at diammetrically opposite sides of body 10, and are provided for engagement by a user's thumb and forefinger in squeezing body 10 to release cords 11 and 12 for longitudinal sliding movement within passage 14. The two projections 17 and 18 are elongated parallel to one another and parallel to axis 19 of passage 14, and are symmetrical with respect to that axis. The projections extend laterally beyond spherical surface 15 of body 10, and may have the rectangular cross-section illustrated in FIG. 3 transversely of axis 19 except as that cross-section is interrupted or truncated by the spherical surface. To describe that cross-section more specifically, projections 17 and 18 may have parallel planar opposite side surfaces 32 and 33 spaced equidistantly at opposite sides of plane 28, and have outer planar surfaces 34 parallel to and equidistant from plane 31. At their opposite ends, projections 17 and 18 may have planar end surfaces 35 perpendicular to axis 19.

In placing the cord lock 10 in use, the two end portions 11 and 12 of cord 13 are inserted downwardly as viewed in FIG. 1 through passage 14 in the elastomeric body of the cord lock, to exit from the lower end of that passage. After such insertion, the lower extremities of cords 11 and 12 may if desired be enlarged, as represented at 36, to prevent accidental removal of the cords from passage 14. Such enlargement may be attained by merely heating those extremities with an iron or the like to melt only the tip ends of the cords to an enlarged condition. Alternatively, the ends of the cords may be left in their original condition to permit upward withdrawal of the cords from the device 10 if the use to which the cords are to be put requires such withdrawal.

As illustrated in FIG. 2, the cords are of a diameter D substantially greater than the maximum width dimension 22 of passage 14, so that when the cords are present in the passage they force the two side walls 26 and 27 of the passage laterally apart to a widened condition against the resistance offered by the resilience of the material of the cord lock body 10. Thus, in the condition illustrated in full lines in FIG. 2, the two walls 26 and 27 of passage 14 exert yielding force against opposite sides of the two cords 11 and 12 to frictionally retain those cords against longitudinal movement relative to body 10. When it is desired to release the locking action on the cords, a user squeezes the elastomeric body 10 to a reduced dimension in the direction represented at 25 in FIG. 3, and by that squeezing action acts to force walls 26 and 27 of passage 14 away from one another, to positions such as those represented in broken lines at 26a and 27a in FIG. 2, thus increasing the width dimension 22 of passage 14 to a value greater than the diameter D of cords 11 and 12. The cords are then free for longitudinal movement relative to the elastomeric body of device 10, to adjust the setting of the device 10 on the cords, after which the squeezing force on body 10 may be released to permit walls 26 and 27 to again be urged yieldingly against opposite sides of the cords to lock them against movement relative to the locking device. In squeezing body 10, the user presses inwardly with his thumb and forefinger against the outer surfaces 34 of the two projections 17 and 18 of body 10. These projections thus act to provide engagement surfaces for the thumb and forefinger and act as indicators telling the user how to grasp body 10. The arrows 37 and 38 in FIG. 2 represent the direction in which the squeezing force is applied, and the broken lines 39 represent the manner in which the outer surface of the body may expand upwardly and downwardly in that figure when the body is squeezed.

Body 10 and the cords may be formed of any material or materials capable of functioning and responding in the manner discussed above. Preferably both are formed of a resiliently deformable resinous plastic material, desirably the same material, with the engaging surfaces of these elements (that is, surfaces 26 and 27 of body 10 and the external surfaces of cords 11 and 12) having the same surface characteristics. As indicated previously, each of the cords 11 and 12 is preferably formed of plastic tubing, having an outer circularly continuous and uninterrupted normally cylindrical surface 40 centered about an axis 41, and containing a normally cylindrical passage 42 also centered about that axis. Though no attempt has been made to illustrate it in the drawing, the resilient tubing is slightly compressed by walls 26 and 27 in the locked condition of the device, causing the tubing to depart from its normal perfectly circular configuration, and the resilient surfaces 26 and 27 are themselves also slightly deformed at the points of contact with the cords, in a manner increasing the effective area of engagement between the surfaces and thereby increasing the frictional resistance to longitudinal movement of the cords.

It is currently preferred that body 10 of the cord lock and the tubular cords 11 and 12 both have a Shore hardness on the A scale between about 50 and 60, and preferably about 55. It is also felt desirable that both of the side wall surfaces 26 and 27 of the passage 14 in body 10, and the engaging external surfaces of the tubular cords, have a gloss finish. The preferred material for both the cord lock body and cords is a virgin vinyl compound, though other substances having the discussed characteristics may be employed.

While a certain specific embodiment of the present invention has been disclosed as typical, the invention is not limited to this particular form, but rather is applicable broadly to all such variations as fall within the scope of the appended claims.

I claim:

1. A cord lock, comprising:

a body of resiliently deformable elastomeric material containing a passage through which at least one cord is to extend;

said passage, as viewed in a predetermined transverse plane, having an oblong cross section in a normal condition to which the resilience of said body tends to return, with said cross section having a minor dimension in a first transverse direction and a major dimension in a second transverse direction generally perpendicular to said first direction;

said minor dimension being defined by opposed first walls of said passage which in said normal condition are spaced apart but in close enough proximity to one another to simultaneously engage opposite sides of a cord or cords in the passage, and be urged against said opposite sides of the cord or cords by the resilience of said elastomeric material, to thereby resist movement of the cord or cords longitudinally relative to the body;

said major dimension being defined by second walls of the passage extending between and joining said spaced first walls at opposite ends of the oblong cross section of the passage as viewed in said plane;

said spaced first walls of the passage, as viewed in said plane and in said normal condition, continuing in said close proximity, near enough to engage and bear against opposite sides of a cord or cords in the passage, through an extended distance in said second transverse direction at least three times as great as the greatest spacing between said first walls in said predetermined transverse plane;

said elastomeric body being manually compressible by a user in said second transverse direction in a manner spreading said first walls of the passage apart in said first transverse direction against the resilience of said elastomeric material, and releasing the cord or cords for movement longitudinally relative to the elastomeric body.

2. A cord lock as recited in claim 1, in which said body has projections at opposite sides thereof extending beyond adjacent portions of the body for engagement by the thumb and finger of a user in squeezing the body to release the cord or the cords.

3. A cord lock as recited in claim 2, in which said projections are elongated essentially parallel to one another and essentially longitudinally of said passage.

4. A cord lock as recited in claim 1, in which said body is externally essentially spherical.

5. A cord lock as recited in claim 1, in which said first walls of the passage as viewed in transverse section are bowed slightly away from one another.

6. A cord lock as recited in claim 1, in which said body has an outer essentially spherical surface, and has projections extending outwardly beyond said spherical surface at opposite sides of the body for engagement by the thumb and finger of a user in squeezing the body to release the cord or cords.

7. A cord lock as recited in claim 6, in which said projections are elongated essentially parallel to one another and essentially longitudinally of said first passage, said walls of the passage as viewed in transverse section being bowed slightly away from one another.

8. The combination comprising a cord lock as recited in claim 1, and a cord or cords extending through said passage in the body and engaged yielding by said opposed first walls of the passage.

9. The combination as recited in claim 8, in which each cord is an elongated flexible tube.

10. The combination as recited in claim 8, in which each cord is an elongated tube of resiliently deformable resinous plastic material having an essentially cylindrical and essentially smooth outer surface frictionally engaging said first walls of said passage to retain the cord or cords against longitudinal movement.

11. The combination as recited in claim 8, in which each cord is an elongated flexible element of resiliently deformable material having an essentially smooth continuous outer surface frictionally engaging said first walls of the passage to retain the cord or cords against longitudinal movement.

12. The combination as recited in claim 8, in which said body has an outer essentially spherical surface, and has projections extending outwardly beyond said spherical surface at opposite sides of the body for engagement by the thumb and finger of a user in squeezing the body to release the cord or cords.

13. The combination as recited in claim 12, in which each cord is an elongated flexible element of resiliently deformable material having an essentially smooth continuous outer surface frictionally engaging said first walls of the passage to retain the cord or cords against longitudinal movement.

* * * * *